United States Patent
Wu et al.

(10) Patent No.: US 8,395,990 B2
(45) Date of Patent: Mar. 12, 2013

(54) METHOD AND APPARATUS FOR STREAMING SCALABLE MULTIMEDIA DATA STREAMS

(75) Inventors: Zhenyu Wu, Plainsboro, NJ (US); Zhengye Liu, Brooklyn, NY (US); Alan Jay Stein, Princeton Junction, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 275 days.

(21) Appl. No.: 12/739,970

(22) PCT Filed: Nov. 1, 2007

(86) PCT No.: PCT/US2007/023079
§ 371 (c)(1),
(2), (4) Date: Apr. 27, 2010

(87) PCT Pub. No.: WO2009/058118
PCT Pub. Date: May 7, 2009

(65) Prior Publication Data
US 2010/0246390 A1    Sep. 30, 2010

(51) Int. Cl.
*H04J 1/16* (2006.01)
*H04Q 7/24* (2006.01)
(52) U.S. Cl. ......... 370/230; 370/252; 370/338; 370/469
(58) Field of Classification Search .................. 370/230, 370/252, 338, 469
See application file for complete search history.

(56) References Cited

U.S. PATENT DOCUMENTS
8,023,490 B2   9/2011   Gessner

2002/0054578 A1   5/2002   Zhang et al.
(Continued)

FOREIGN PATENT DOCUMENTS

| CN | 1452825 A | 10/2003 |
| CN | 1547835 A | 11/2004 |
| CN | 1917639 A | 2/2007 |
| JP | 2005518729 A | 6/2005 |
| JP | 2007522727 A | 8/2007 |

(Continued)

OTHER PUBLICATIONS

Stockhammer et al. "Feedback and Error Protection Strategies for Wireless Progressive Video Transmission" IEEE Transactions on Circuits and Systems for Video Technology, vol. 12, No. 6, Jun. 2002, pp. 465-482.

(Continued)

*Primary Examiner* — Andrew Lee
(74) *Attorney, Agent, or Firm* — Robert D. Shedd; Jeffrey M. Navon; Catherine A. Cooper

(57) ABSTRACT

A method and apparatus are described including receiving a coded packet of content associated with a layer, receiving feedback information regarding channel conditions and applying hybrid automatic repeat request to deliver the packet based on said feedback information. The method and apparatus wherein applying hybrid automatic repeat request layer-wise further includes determining if a resource is exhausted, scheduling delivery of layered coded content packets for a layer, if the resource has not been exhausted, determining if all layered coded content packets for the layer have been transmitted, proceeding to the first determining step, if all layered coded content packets for a layer have not been transmitted, determining if an acknowledgement message has been received from a user device, determining if the resource is exhausted, if no acknowledgement has not been received and scheduling delivery of layered coded forward error correction packets, if the resource has not been exhausted.

16 Claims, 5 Drawing Sheets

U.S. PATENT DOCUMENTS

| | | | |
|---|---|---|---|
| 2005/0120038 A1 | 6/2005 | Jebb | |
| 2007/0238462 A1* | 10/2007 | Pedersen | 455/436 |
| 2009/0109912 A1* | 4/2009 | DiGirolamo et al. | 370/329 |
| 2011/0038387 A1* | 2/2011 | Han et al. | 370/480 |
| 2011/0299447 A1* | 12/2011 | Rudolf et al. | 370/311 |
| 2012/0076098 A1* | 3/2012 | Han et al. | 370/329 |

FOREIGN PATENT DOCUMENTS

| | | |
|---|---|---|
| WO | 0241584 A2 | 5/2002 |
| WO | 02/052862 A2 | 7/2002 |
| WO | 2003071806 A1 | 8/2003 |
| WO | 2005076575 A1 | 8/2005 |
| WO | 2005099271 A1 | 10/2005 |

OTHER PUBLICATIONS

Chakaresk, et al. "Application Layer Error-Correction Coding for Rate-Distortion Optimized Streaming to Wireless Clients," IEEE Transactions on Communications, vol. 52, No. 10, Oct. 2004, pp. 1675-1687.

International Search Report for PCT/US2007/023079 dated Sep. 16, 2008.

Nagao, Hiroyuki, Quality Control of Layered Streaming Using Multiple Error Correction Methods, Information Processing Society of Japan, vol. 2004, No. 8 pp. 37-42.

\* cited by examiner

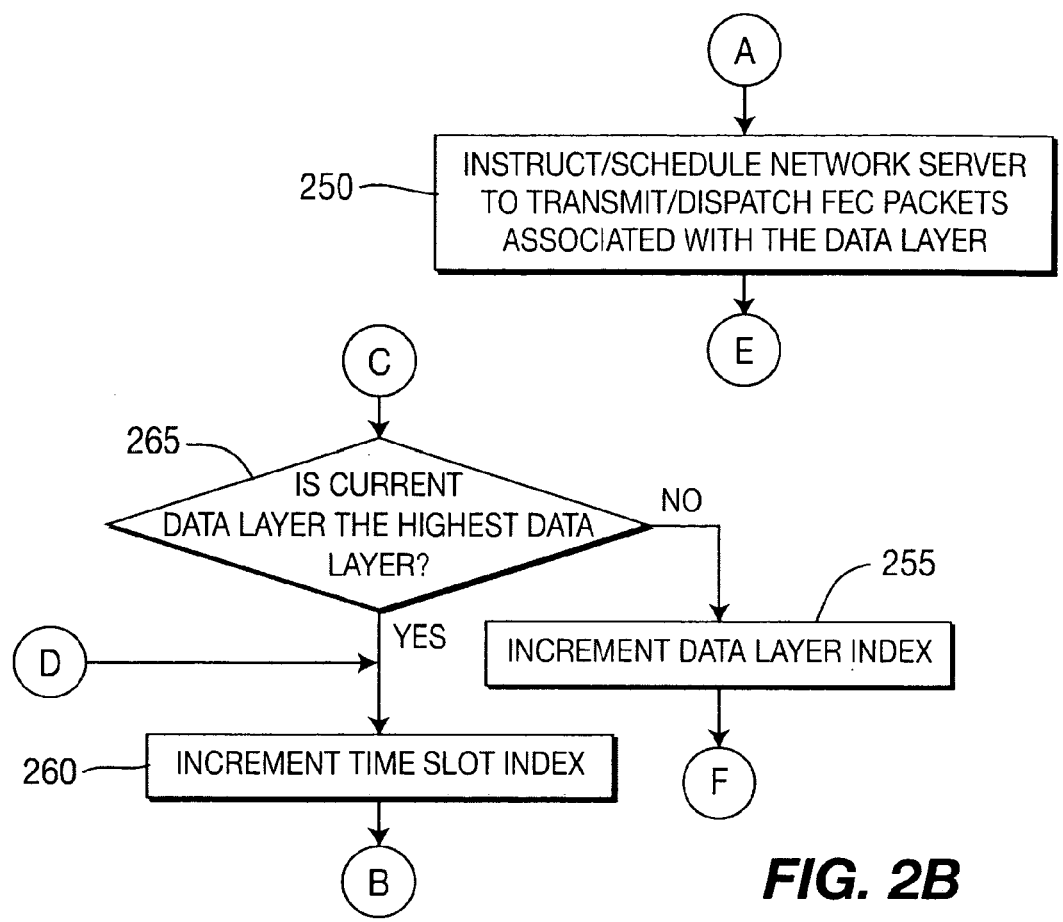
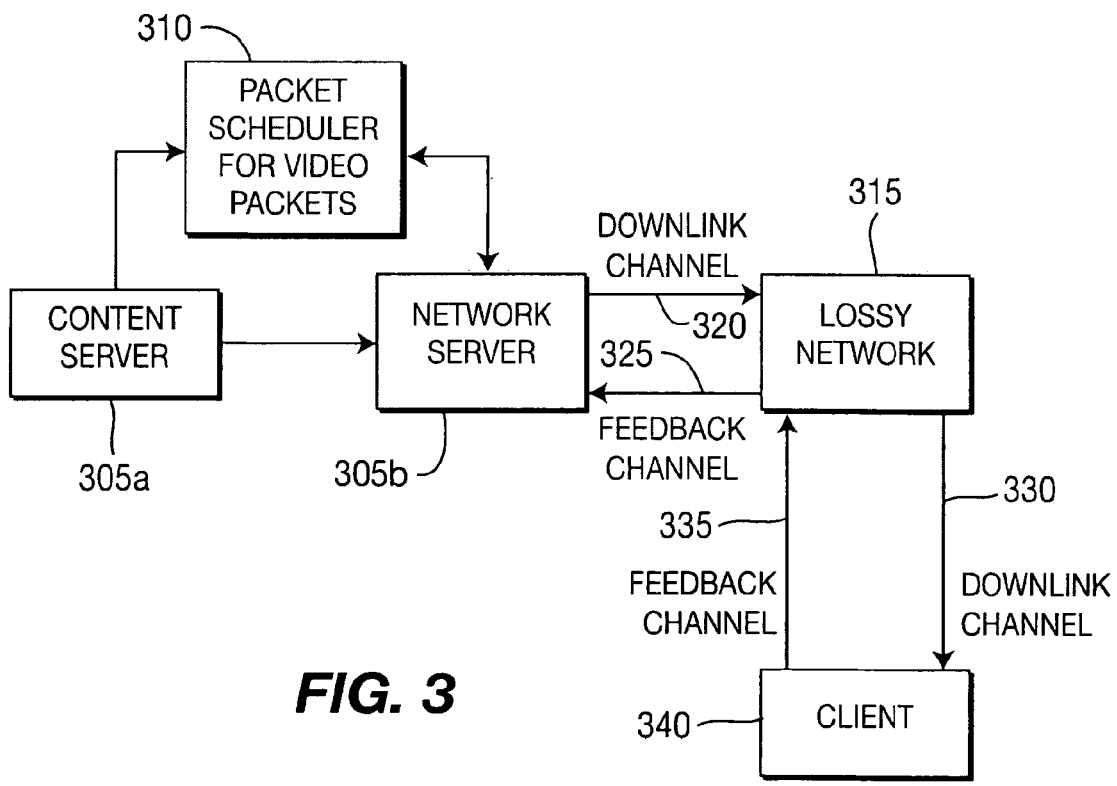

METHOD AND APPARATUS FOR STREAMING SCALABLE MULTIMEDIA DATA STREAMS

This application claims the benefit, under 35 U.S.C. § 365 of International Application PCT/US2007/023079, filed Nov. 1, 2007, which was published in accordance with PCT Article 21(2) on May 7, 2009 in English.

FIELD OF THE INVENTION

The present invention relates to streaming scalable multimedia data streams and, in particular, to streaming multimedia data streams in both unicast and multicast environments over lossy networks.

BACKGROUND OF THE INVENTION

Multimedia streaming applications are typically among the real-time services offered by a wired or wireless network. Real-time services, such as multimedia streaming, are characterized by delay constraints. The multimedia streamed data (service data) that arrives late at the client are generally discarded by the client. Multimedia streaming data typically has a deadline associated with the data because it is being displayed to a user at the client device. Due to reasons such as congestion or channel impairment in the network, timely and correct delivery of multimedia streaming data to the client cannot always to be guaranteed. Therefore, at the client, there can be multimedia data missing during playback.

Due to the large volume of multimedia data, multimedia streaming applications often require large network bandwidths. For those bandwidth-constrained networks, a data transfer rate limit is often imposed on such an application. Herein bandwidth, data transfer rate and network transfer rate are all used interchangeably. Bandwidth is typically measured in Hertz but in digital communications bandwidth is frequently specified in bits per second (bps), which is actually a transfer rate. Meanwhile the network bandwidth available to upper layer applications, for example, file downloading and web browsing, may also vary over time, depending on factors such as network congestion, physical layer channel outage, etc. When the available network bandwidth is less than the amount requested by the multimedia streaming application, the streaming server may be forced to discard multimedia data in order to the reduce data rate according to some data dropping policy. Any of the above reasons can cause data loss to occur at the client, which can negatively impact client playback quality.

It would be advantageous, therefore, to have a method and apparatus to improve multimedia playback quality when a delay and/or bandwidth constrained multimedia streaming application is delivering multimedia data over a lossy network. As used herein, "/" denotes alternative names for the same or similar acts or components.

SUMMARY OF THE INVENTION

Multimedia streaming applications often have strict delay and bandwidth constraints. The present invention describes a method and apparatus for the server to stream multimedia content that are compressed by scalable codec(s) to the client(s) through a lossy network which provides a feedback channel. With the present invention, the multimedia playback quality at the client side can be improved.

A method and apparatus are described including receiving a coded packet of content associated with a layer, receiving feedback information regarding channel conditions and applying hybrid automatic repeat request to deliver the packet based on said feedback information. The method and apparatus wherein applying hybrid automatic repeat request layerwise further includes determining if a resource is exhausted, scheduling delivery of layered coded content packets for a layer, if the resource has not been exhausted, determining if all layered coded content packets for the layer have been transmitted, proceeding to the first determining step, if all layered coded content packets for a layer have not been transmitted, determining if an acknowledgement message has been received from a user device, determining if the resource is exhausted, if no acknowledgement has not been received and scheduling delivery of layered coded forward error correction packets, if the resource has not been exhausted.

BRIEF DESCRIPTION OF THE DRAWINGS

The present invention is best understood from the following detailed description when read in conjunction with the accompanying drawings. The drawings include the following figures briefly described below:

FIGS. 2A and 2B taken together are a flowchart of the operation of the present invention.

FIG. 3 is a block diagram of a packet scheduler in accordance with the principles of the present invention.

DETAILED DESCRIPTION OF THE PREFERRED EMBODIMENTS

Figure 1:
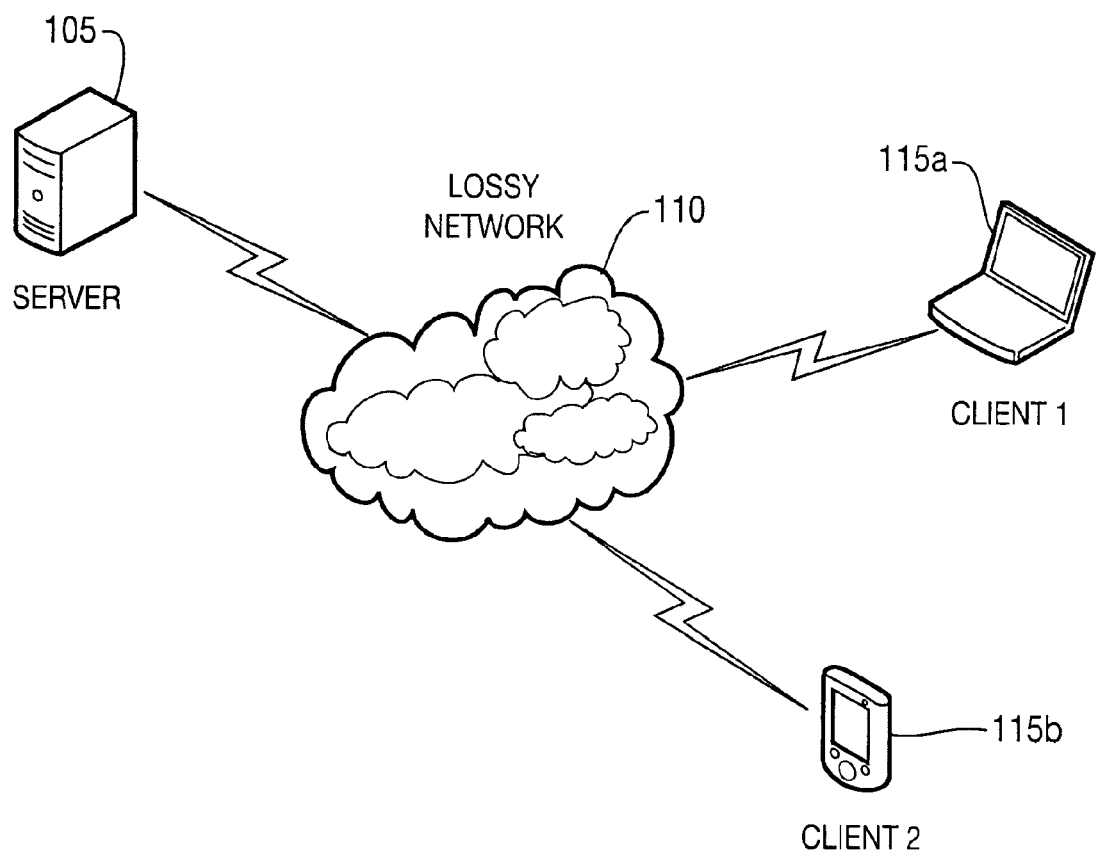
FIG. 1 is an overview of the environment within which the present invention operates in unicast.

Real-time multimedia services require high data reliability and a low bounded time delay. However, many networks over which such services are offered are error-prone and bandwidth limited. Thus, proper error control techniques are necessary to obtain acceptable service quality.

As used herein "client" includes any user device, end device, mobile terminal, computer, processor, laptop, personal digital assistant, dual mode mobile phone, set top box or any other device that could be used to display or playback content including audio, video and multimedia content. As used herein source or service data includes any form of uncompressed/compressed content, including audio, video and multimedia data.

Forward error correction (FEC) coding is a commonly used error control technique to improve the throughput of a lossy network. FEC adds controlled redundancy to the service data and the redundancy data (also called FEC data herein) are also sent to the client over the network. Whenever there are data losses, the client can utilize the redundancy provided by the FEC data to detect and recover losses. However, in order to recover data losses effectively, the amount of FEC needs to be adjusted according to the network loss condition. But such accurate information is hard to come by due to time-varying characteristics of many network channels, for example, wireless networks. Therefore, for such networks, under provisioning FEC can cause FEC failure, while over provisioning FEC can unnecessarily decrease network throughput, both of which can cause multimedia playback quality degradation.

Retransmission is another technique commonly used in a lossy network when the network provides a feedback channel and the client is capable of generating feedback information. A typical protocol designed for retransmission works as follows. At the transmitter side, when the service data is sent over the network, the server waits for an acknowledgment (ACK) from the client through the network feedback channel. At the receiver side, an ACK is only sent by the client when the client receives all the data correctly. After a certain time period (called time-out period), if the server has not received an ACK, it assumes the data is lost and transmits again the same data to the client. This process is repeated until the server receives the ACK from the client for the data, and then the same process begins for the following data if any. The retransmission method generally only transmits the data again that are lost during transmission, so it is bandwidth efficient. However, the server has to wait for the ACK to act, which usually introduces a long delay that is not suitable for real-time multimedia services. Also the method does not scale well. When the number of clients is large, the number of ACKs may grow unbounded and, thus, can seriously impact throughput. The problem of unbounded ACKs is referred to as the ACK explosion problem.

A third method is hybrid Automatic Repeat-reQuest (ARQ), which combines the benefits of both retransmission and FEC. With hybrid-ARQ, at the transmitter side, the server first sends out user data and then FEC data to the client. During this process, when the client has received all the user data or enough FEC data to recover losses, the client sends an ACK back to the server through a feedback channel provided by the network. Once the server receives an ACK, it stops sending any more data. Since the amount of FEC data sent to the client can be adjusted properly according to the current network conditions through ACKs, hybrid-ARQ is able to maintain high bandwidth efficiency. However, when the network experiences excessive losses, the server may have to send a large amount of FEC data before it can receive an ACK. When the amount of the FEC data exceed the data transfer rate limit, or the duration of the FEC delivery exceeds the delay constraint, content data losses can still occur with the hybrid-ARQ method, which can degrade multimedia playback quality.

A scalable source coder compresses source content and generates a scalable coded bitstream so that parts of a bitstream can be removed in a way that the resulting sub-bitstream forms another valid bitstream for a given decoder, which represents the source content with a reduced reconstruction quality compared to the original bitstream. There are many scalable source coders, for example H.264/AVC (temporal scalability), SVC (temporal, SNR and spatial scalabilities) for video coding, and JPEG2000, SPIHT for image coding, etc.

A scalable source bitstream generated by the aforementioned source coders can be divided into a number of layers. The first layer contains a representation of the source and is independently decodable. Each following layer contains additional information about the source and has to rely on all the previous layers for the correct decoding. Hence, in general, among all the layers of a scalable bitstream, the first layer has the highest importance in terms of reconstructing the original source, and the importance of the other layers decreases as its layer index increases.

In the following, a multimedia streaming application unicasting a scalable bitstream over a lossy network with feedback channel to a client is considered. The application has data rate transfer rate and delay constraint, which will be described below.

Suppose a unit of multimedia content is encoded by a scalable source coder into M layers (M∈N), such that the importance of layer m decreases as m grows ($1 \leq m \leq M$, m∈N). Assume further that the bitstream from source layer m is packetized into $K_m$ source packets for network delivery. In addition, $L_m$ FEC packets are encoded for layer m, using certain FEC codes such as Reed-Solomon (RS) codes. In particular, assume $L_m$ is large enough to recover possible data losses for layer m, without any data transfer rate or delay constraint. In the following, "data packets" include both source and FEC packets in general.

In computer networks and as used herein, bandwidth is often used to indicate a data transfer rate and is, thus, usually denoted as bits per second. In most networks a communications path includes a series of links between individual nodes along the path. The bandwidth of the path is limited by the lowest bandwidth between any two links.

Let B be the network transfer bit rate (in bps) assigned to the application, and T be the duration (in seconds) of a time slot during which the application is allowed to transmit data. For each time slot, BT equals to the total bit budget (total number of bits that are or can be transmitted over the link in a given time slot) allocated for the application and denote $[d_1, d_2]$ as the playback deadline incrementally for the video data inside.

The present invention combines the hybrid-ARQ method with the scalable source coding property for multimedia data streaming. At the beginning of each time slot during which the server is allowed to transmit data, the server obtains the information about the number of packets for each layer of the scalable bitstream that have a playback deadline falling in $[d_1, d_2]$. Such information can usually be obtained at the content server, which encodes/stores the content data. The network server requests and receives such information from the content server. The network server then informs the client about the information, by means such as dedicated information packets, or as side information delivered through packets from the previous time slots, for example in the packet header.

At the transmitter side, once the network server is guaranteed the client's receipt of the information regarding the number of source packets in the layer, it starts sending the data packets that belong to the time slot. In particular, the network server first sends the data packets that come from the layer with the lowest layer index (highest priority) and then proceeds to the next layer with an incrementally higher layer index. Within each layer, the source packets are sent first followed by the FEC packets.

At the receiver side, the client receives data packets for a layer and constantly checks if it has received all the source packets for the layer, or it can use the received FEC packets to recover any missing source packets. This is possible because the client is aware of the exact number of source packets for each layer it expects for the time slot. Once all the source packets are available for the current layer, it sends an ACK through the feedback channel to the server. The client repeats the above process for each data packet it receives for the current layer.

During the transmission, one of the following three events can happen to the server:
1. An ACK from the client arrives.
2. The bit budget BT for the time slot is exhausted.
3. The time duration T has passed for the time slot.

Event 1 indicates that the client has received or is able to recover all video packets from layer m. In response to this event, the server stops sending data packets for layer m and proceeds to sending data packets from layer m+1 (when m+1≦M). In the case the where current layer is the highest available layer, the server simply stays idle and waits for the next time slot. When event 2 or 3 occurs, it indicates the application has reached its data transfer rate limit. The server then has to wait for the next time slot and repeats the above operations.

The present invention can be further extended to multicasting multimedia data to groups of clients. For each layer m, only one ACK is sent back to the server each time, when every client in the group has received or is able to recover the source layer. In one embodiment, there are classes of clients/receivers/user devices in a wired/wireless network. Groups of clients are categorized/clustered based on their channel loss conditions. So the multicast group a client belongs to may change over time as the channel condition for the individual client changes. That is, an individual client may join or leave one or more groups over time based on its channel conditions. In such a scenario, the clients in a group communicate among themselves and a single ACK corresponding to a content layer may be transmitted for the group when the individual client that is least able to receive/recover the content layer has done so. In the case of a request for retransmission the individual client with the most packets needed to be retransmitted makes the request. That is, in all cases described above, the individual client with the most need/worst conditions is the only client in the group of clients to respond for each content layer. This addresses the ACK explosion problem by using feedback suppression.

Given a bandwidth or delay constraint, the present invention allocates the remaining resources to guarantee the correct delivery of the current source layer, starting from the data with the most importance, to the data with the least importance. For each successfully delivered layer of multimedia data, because of the use of hybrid-ARQ, the invention can maintain high bandwidth efficiency for a lossy network. In the case where the given resource is exhausted before all the multimedia data belonging to a time slot is delivered to the client, the present invention guarantees minimal performance loss by exploiting the scalability property of the source bitstreams. Hence, the present invention can provide flexible bit rate adaptation according to the network lossy conditions and provide improved multimedia playback quality at the client.

FIG. 1 is an overview of the environment within which the present invention operates in unicast. Server 105 schedules content for transmission to clients/user devices over a lossy network 110. Server 105 as will be shown in FIG. 3 can include two servers—a content server and a network server. The network provides for a feedback channel to inform server 105 of receipt by the user device/client 115a, 115b of the transmitted content or the receipt by the user device of sufficient packets (content and FEC) in order to recover the current layer of coded content.

Figure 2A:
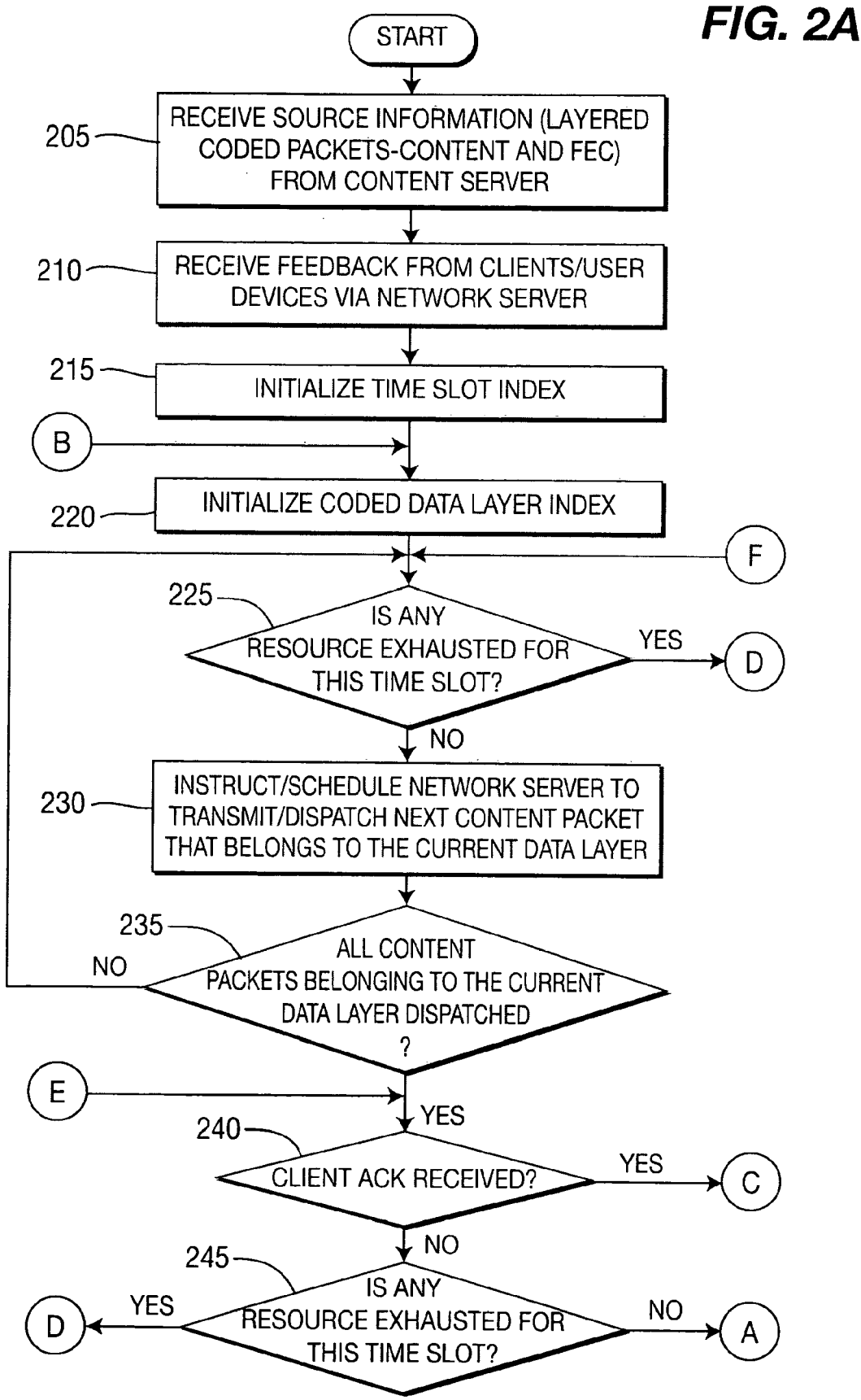

FIGS. 2A and 2B taken together are a flowchart of the operation of the packet scheduler of the present invention. In this embodiment of the present invention, the packets are transmitted/dispatched in unicast to a plurality of clients/user devices/receivers. At 205, the packet scheduler (shown in FIG. 3) receives layered coded packets (content and FEC) from content server (shown in FIG. 3). The packet scheduler also receives feedback at 210 from the clients/user devices over a feedback channel from the network server (shown in FIG. 3). The packet scheduler then initializes a time slot index at 215. At 220, the packet scheduler initializes a coded data layer index. A test is performed at 225 to determine if any resources have been exhausted for this time slot. That is, a determination is made if the bit budget for the time slot or the deadline for packet delivery expired. If any resource has been exhausted then the time slot index is incremented at 260. If no resources have been exhausted then at 230, the packet scheduler instructs/schedules the network server to transmit/dispatch the next content packet that belongs to the current coded data layer. At 235, a test is performed to determine if all of the content packets belonging to the current layer have been transmitted/dispatched. If all of the content packets belonging to the current layer have not been dispatched then the process proceeds to 225. If all of the content packets belonging to the current layer have been dispatched/transmitted then a test is performed at 240 to determine if an ACK has been received from the client. If an ACK has been received from the client then a test is performed at 265 to determine if the current layer index is the highest layer index. If the current layer is not the highest layer then the process proceeds to 255 where the packet scheduler increments the coded data layer index. The process then proceeds to 225. If the current layer index is the highest layer index then the time slot is incremented at 260. If no ACK has been received from the client then a test is performed at 245 to determine if any resources have been exhausted for this time slot. That is, a determination is made if the bit budget for the time slot or the deadline for packet delivery expired. If any resource has been exhausted then the time slot index is incremented at 260. If no resources have been exhausted then at 250 the packet scheduler instructs/schedule the network server to transmit/dispatch the FEC packets.

FIG. 3 is a block diagram of a server in accordance with the principles of the present invention. Server 105 shown in FIG. 1 may be implemented as content server 305a and network server 305b. Content server 305a is responsible for providing layered-coded video bitstreams to network server 305b as well as source information to the packet scheduler module 310. Packet scheduler module receives the layered coded packets from the content server and receives feedback from user devices/clients via network server 305b. Packet scheduler module 310 forwards packet scheduling information to network server 305b as discussed above with reference to FIGS. 2A and 2B. Packet scheduler module 310 can be implemented both in hardware or software or a combination. Network server 305b transmits packets (content and FEC) to and over lossy network 315 over downlink channel 320. Lossy network transmits packets (content and FEC) over downlink channel 330 to clients/user devices 340. As used herein and especially in a multicast environment clients/user devices 340 can be multiple classes of clients/receivers/user devices. Lossy network 315 receives feedback from clients/receivers/user devices over feedback channel 335, which feedback lossy network 315 forwards over feedback channel 325 to network server 305b. FIG. 3 shows a single client/user device/receiver. In actual practice it is assumed that there are multiple clients. The point of FIG. 3, however, is that this embodiment of the present invention is unicast to a plurality of clients. It should also be noted that the functionality of the packet scheduler can be in a module (software or hardware) on its own as shown or the functionality can be split between the content server 305a and the network server 305b or all three units (the content server 305a, the network server 305b and the packet scheduler 310) may be combined in a single device.

Figure 4:
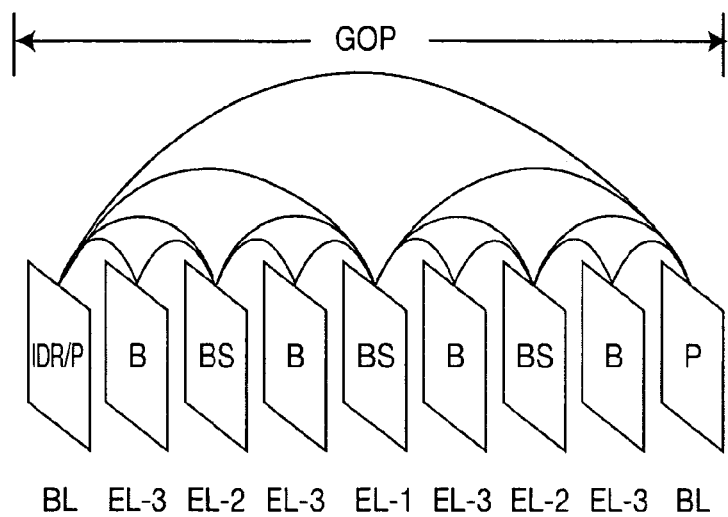
FIG. 4 is an exemplary temporal scalability coding structure.

FIG. 4 is an exemplary temporal scalability coding structure using H.264 main profile to perform the encoding. H.264 is one of several possible coding schemes. The set of pictures in FIG. 4 is called a "group of Pictures" or GOP, which can be divided into a base layer (BL) and multiple enhancement layers (ELs). FIG. 4 shows 3 ELs in the temporal direction.

The BL includes slices of instantaneous decoder refresh (IDR) and P/B types. The ELs include slices of reference and non-reference B-types denoted as Bs and B respectively. The arrows in FIG. 4 indicate the reference dependencies during encoding. The reference dependencies form a hierarchical motion prediction structure. From FIG. 4 it can be seen that the BL is independently decodable and El-n has to rely on BL and EL-m (where m<n) for correct decoding. Furthermore because of the prediction dependencies, a missing picture from EL-m only affects pictures from higher layers such as EL-n. A lost picture, however, from the BL can affect all of the following pictures until the next IDR is received. Consequently, in such a coding structure, the BL is generally the most important (and thus layer having the lowest index) followed by EL-1, EL-2 and EL-3 in order of decreasing importance. Such a coding structure satisfies layered content coding. It is specifically noted that the layered hybrid-ARQ can also work with other content coding scalability dimensions.

Figure 5:
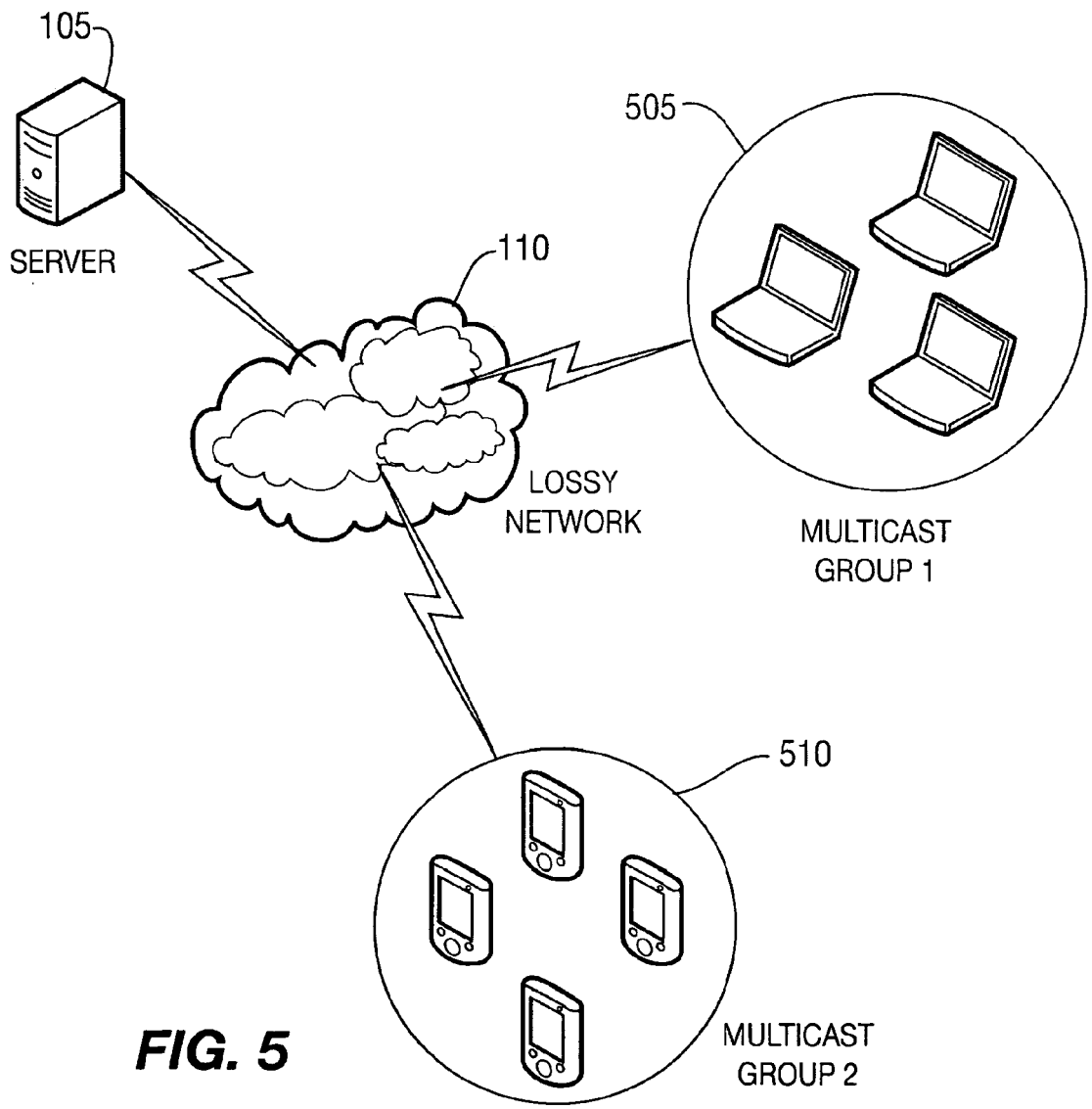
FIG. 5 is an overview of the environment in which the present invention operates in multicast.

FIG. 5 is an overview of the environment in which the present invention operates in multicast. Server 105 and lossy network 110 are as described above with reference to FIG. 1. Multicast group 1 505 is a class of clients/user devices/receivers which have joined multicast group 1 based on their channel conditions, where channel conditions are often a function of distance from the source. Multicast group 2 510 is another class of clients/user devices/receivers which have joined multicast group 2 based on their channel conditions. There may be additional multicast groups in the environment.

Figure 6:
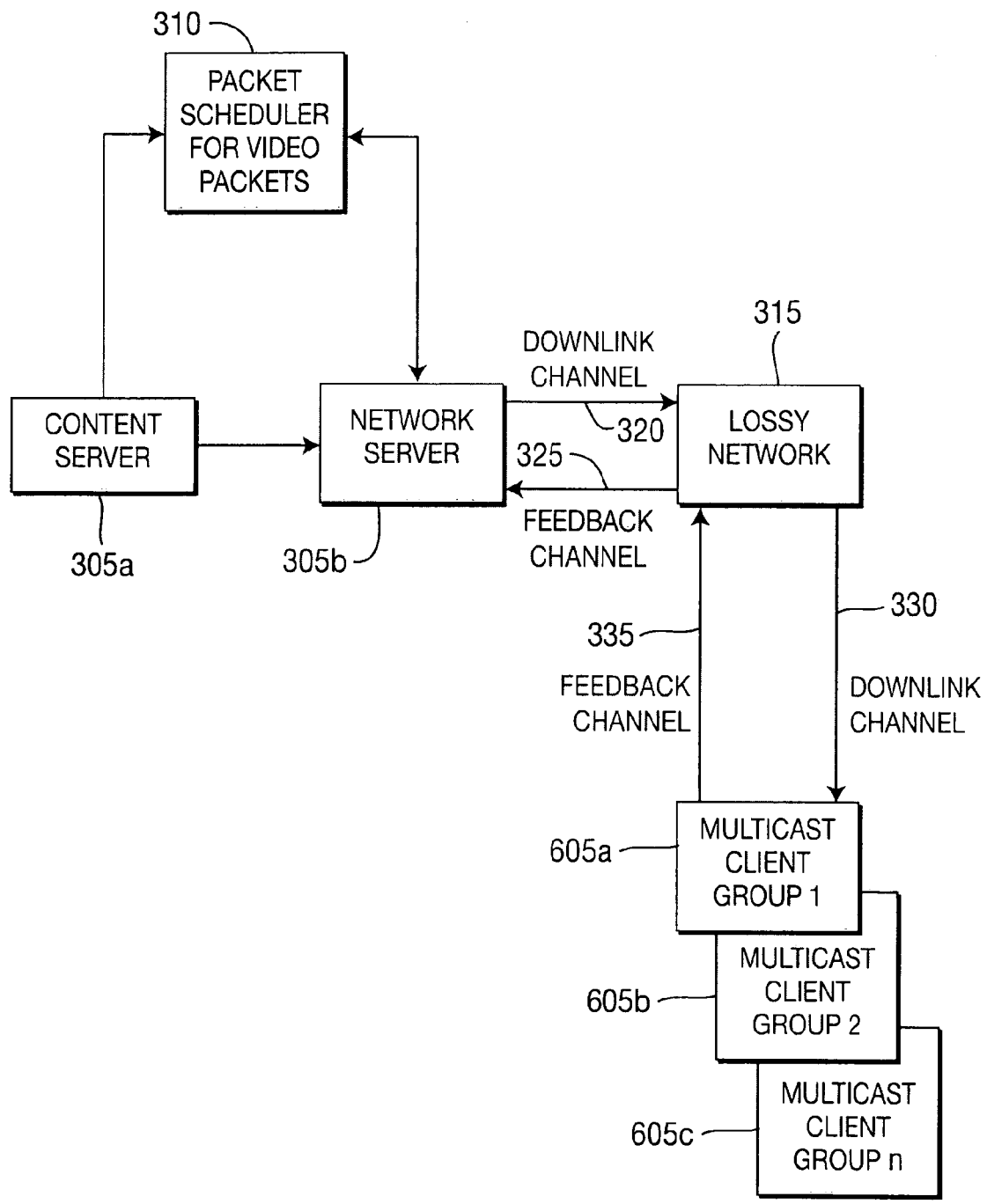
FIG. 6 is a block diagram of a packet scheduler in accordance with the principles of the present invention.

FIG. 6 is a block diagram of a packet scheduler in accordance with the principles of the present invention. In this embodiment of the present invention the packet scheduler performs scheduling for groups of clients as opposed to individual clients in accordance with the description of the extension of the principles of the present invention from unicast to multicast. 305a, 305b, 310-335 are as described above with reference to FIG. 3. Multicast client groups 605a, 605b and 605c each can have a single client or a plurality of clients.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method, said method comprising:
receiving a coded packet of content associated with a layer;
receiving feedback information regarding channel conditions;
transmitting information regarding a number of compressed content packets of each layer having a playback deadline; and
applying layer-wise hybrid automatic repeat request to deliver said packet based on said feedback information, wherein said layer-wise hybrid automatic repeat request is applied to each layer starting with a base layer until all data from said base layer is correctly received before applying said layer-wise hybrid automatic repeat request to a subsequent layer, each subsequent layer having decreasing importance.

2. The method according to claim 1, wherein applying hybrid automatic repeat request layer-wise further comprises:
determining if a resource is exhausted;
scheduling delivery of layered coded content packets for a layer, if said resource has not been exhausted;
determining if all layered coded content packets for said layer have been transmitted;
proceeding to said first determining step, if all layered coded content packets for a layer have not been transmitted;
determining if an acknowledgement message has been received from a user device;
determining if said resource is exhausted, if no acknowledgement has been received; and
scheduling delivery of layered coded forward error correction packets, if said resource has not been exhausted.

3. The method according to claim 2, further comprising:
initializing a time slot index; and
initializing a layer index.

4. The method according to claim 3, further comprising;
incrementing said time slot index, if said layer index is a highest layer index; and
re-initializing said layer index.

5. The method according to claim 2, wherein said resource is bandwidth constrained.

6. The method according to claim 2, wherein said resource is transmission time.

7. The method according to claim 2, wherein said layered coded packets are generated by a scalable coder.

8. The method according to claim 2, wherein said layered coded packets are scheduled for delivery in order of their importance as indicated by said layer index.

9. An apparatus, comprising:
means for receiving a coded packet of content associated with a layer;
means for receiving feedback information regarding channel conditions;
means for transmitting information regarding a number of compressed content packets of each layer having a playback deadline; and
means for applying hybrid automatic repeat request to deliver said packet based on said feedback information, wherein said layer-wise hybrid automatic repeat request is applied to each layer starting with a base layer until all data from said base layer is correctly received before applying said layer-wise hybrid automatic repeat request to a subsequent layer, each subsequent layer having decreasing importance.

10. The apparatus according to claim 9, wherein said means for applying hybrid automatic repeat request layer-wise further comprises:
- means for determining if a resource is exhausted;
- means for scheduling delivery of layered coded content packets for a layer, if said resource has not been exhausted;
- means for determining if all layered coded content packets for said layer have been transmitted;
- means for proceeding to said first determining step, if all layered coded content packets for a layer have not been transmitted;
- means for determining if an acknowledgement message has been received from a user device;
- means for determining if said resource is exhausted, if no acknowledgement has been received; and
- means for scheduling delivery of layered coded forward error correction packets, if said resource has not been exhausted.

11. The apparatus according to claim 10, further comprising:
- means for initializing a time slot index; and
- means for initializing a layer index.

12. The apparatus according to claim 11, further comprising:
- means for incrementing said time slot index, if said layer index is a highest layer index; and
- means for re-initializing said layer index.

13. The apparatus according to claim 10, wherein said resource is bandwidth constrained.

14. The apparatus according to claim 10, wherein said resource is transmission time.

15. The apparatus according to claim 10, wherein said layered coded packets are generated by a scalable coder.

16. The apparatus according to claim 10, wherein said layered coded packets are scheduled for delivery in order of their importance as indicated by said layer.

* * * * *